Patented Sept. 11, 1951

2,567,631

UNITED STATES PATENT OFFICE 2,567,631

STABILIZED CORN AND METHOD THEREFOR

Philip Carlton Anderson and Janet Lorraine Cooper Rapp, Crete, Nebr., assignors to Archem Corporation, Crete, Nebr., a corporation of Nebraska No Drawing. Application April 18, 1950, Serial No. 156,714

6 Claims. (Cl. 99—154)

This invention relates to stabilized corn and a method for making such corn.

As is well known, corn contains considerable moisture at the normal time of harvest. The moisture content at this time may be as high as 20 percent. However, corn cannot be safely stored unless the moisture content is 15 percent in the case of ear corn or 13 percent in the case of shelled corn. As a result, conventional methods of conditioning corn for the long storage periods to which corn is subjected have followed the lines of cribbing it and allowing it to dry naturally until the moisture content was below that favorable for mold growth; whereupon, the corn now below 13 percent moisture content is shelled and placed in bins and periodically moved in order to shake off strands of hyphae of various fungi to prevent the formation of a dense mycelium. An alternate procedure is to dry the corn mechanically either as ear corn or as shelled corn in specially designed mechanical dryers whenever the corn has an excessive moisture content.

Both of the aforesaid operations require considerable expense, either by reason of the labor involved or because of the investment in machinery of limited use. The normal cribbing process moreover is subject to the disadvantage that it requires a special structure having no other use and necessarily of about twice the size of that which would be required if the corn were shelled.

Although the aforesaid mechanical methods of conditioning corn left much to be desired, and although a chemical method might appear indicated, to our knowledge no satisfactory chemical method has ever been devised for the indicated purposes, prior to our present invention. Close study of the many practical considerations involved indicate the difficulties inherent in all chemical methods and hence explain the failure of such methods to be brought forth as a solution to the problem. Some of the practical considerations follow: the chemical had to be detrimental to the protoplasm of the fungi but at the same time harmless to that of the corn or of mammals. In oher words, the treated corn had to be edible insofar as livestock and human beings were concerned. Furthermore, the nutritional value of the corn should not be impaired. In addition, other factors such as taste, color, odor, sheen, or texture of the corn had to remain substantially unaffected by the treatment; otherwise the corn could not be marketed successfully. All of this must be accomplished at a low cost with a chemical or chemicals which is or are not inclined to leave the corn because of volatility.

Accordingly, an object of our invention is to condition corn which is normally subject to deterioration in storage by mold formation by a simple, safe, efficient chemical method. Another object is the provision of a novel composition of matter, comprising essentially corn which per se would be normally subject to deterioration by mold formation in storage, and ethanolamine, the composition being stable against such deterioration. Other objects of our invention are to stabilize corn against mold formation by the use of an edible material which leaves no offensive odor, which is substantially non-volatile, which forms an oily flexible film, which does not appreciably alter the color of the grain, which does not impart an unsatisfactory appearance to the grain, which will enable the early harvesting of corn without damage by phytopathological fungi, which will enable early harvest of high moisture grain which is more palatable for animal consumption and which will enable the grain to be stored. A still further object of our process is to do away with the need of subsequent transfer and turning of the corn during treatment. These and other objects will become apparent from the following description.

In accordance with our invention, we preserve corn which is normally subject to deterioration due to mold formation in storage by treating it in a substantially closed system with two gases which react in situ to form a basic alcoholic liquid which is capable of protecting the corn against mold formation.

While our invention is applicable to unshelled corn, we find it advantageous to employ shelled corn as the use of the latter renders our process more efficient and less costly. Accordingly, we prefer to employ shelled corn which per se is normally subject to deterioration due to mold formation in storage. As the two gases which react in situ to form a basic alcoholic liquid, we employ ammonia and ethylene oxide in the gaseous state. While the gases may be employed in full strength, we have found it sufficient and cheaper to employ each gas diluted with air and the recitation of a gas in the claims is intended to include the use of air or other inert gas and the named gas. It is sufficient to use enough of the two gases so as to effect a substantially complete reaction of the ammonia and to employ sufficient materials to effect a coating of substantially all of the corn kernels.

As will be understood by chemists, ammonia gas and ethylene oxide gas react to form an ethanolamine. In practice, three ethanolamines usually are formed, the relative amounts of each type depending upon the reaction conditions. These are the mono-, di- and tri-ethanolamines. While the mono-ethanolamine has been found to give the best results in most cases, it is understood that in the specification and claims hereof we intend to include by the term "ethanolamine" any of the three ethanolamines, per se or in admixture, wherever the context so admits or requires.

Our process may be conducted in various manners. If desired, a farm type auger conveyor may be provided with inlets leading from gas volume flow meters. Several of the inlets can be connected to an ammonia supply conduit and several of the inlets can be connected to an ethylene oxide supply. The flow meters are set to discharge the predetermined amounts of gases from pressure cylinders in which the gases are sold normally. The gas volume flow meters are synchronized with the auger conveyor so that a controlled volume of each gas, concentrated or diluted with air, as desired, is applied to a given volume of corn conveyed. When the corn has traveled the length of the conveyor, the treatment is complete and the corn is placed in storage.

An alternative method of carrying out our invention is to utilize a large storage bin with perforated floors. A tight tarp cover is spread over the corn. Ammonia is released beneath the corn into a plenum chamber and allowed to seep upward throughout the mass of corn. When a measured amount of ammonia has been applied, ethylene oxide in the gaseous state is released from orifices just beneath the top and allowed to combine with the ammonia as it falls downward.

One unexpected advantageous result of our process is that in addition to protecting the corn from deterioration due to mold formation, our process also gives some protection against insects.

In order more fully to illustrate our invention we are setting forth the following specific examples, which, however, are not intended to be construed as limiting the scope of the invention.

Example 1

Corn is brought in from the field after picking and shelling with a picker-sheller, such as a Case picker-sheller. The moisture content of the corn is then 20 percent. The corn is dumped from truck boxes into an elevator hopper of the closed auger type. Two bottles of gas, one of ammonia and the other of ethylene oxide, are connected to a gas volume metering device which synchronizes the rate of flow of the unmixed gases through the meter with that of the auger elevator. The gases are discharged at various points along the path of the corn in the auger. The gas outlets are so arranged that the ammonia gas first comes in contact with a given kernel of corn and the ethylene oxide gas thereafter comes in contact with the same kernel.

Twenty-eight bushels of shelled corn were treated with one pound of ammonia and approximately 2.6 pounds of ethylene oxide gas in accordance with the foregoing. Several months after treatment, the resulting treated, shelled corn was observed to be free of phytopathological fungi. The untreated, shelled corn, similarly stored, was so infected with fungi, however, that it was useless.

The treated shelled corn is suitable for normal use, being edible and having no offensive odor. The color of the treated shelled corn is substantially the same as the untreated corn, the treated corn being similar to the untreated in general appearance.

Example 2

The procedure of Example 1 was followed employing the same material and obtaining the same results as noted under Example 1, the only difference being that in the present example a bin with perforated floors and provided with a tight tarp cover was employed in place of the auger conveyor; and further, the ammonia was released beneath the corn and allowed to creep upwards throughout the mass; while the ethylene oxide in gaseous state was released from orifices just beneath the top and allowed to combine with the ammonia as it fell downward.

While we have described our invention in detail in its preferred embodiment, it will be obvious to those skilled in the art, after understanding our invention, that various changes and modifications may be made therein without departing from the spirit or scope thereof. We aim in the appended claims to cover all such modifications and changes.

We claim:

1. A method for preserving corn which is normally subject to deterioration due to mold formation in storage, which comprises treating said corn in a substantially closed system with ammonia and ethylene oxide in the gaseous state, whereby an ethanolamine is formed in situ.

2. A method for preserving shelled corn which is normally subject to deterioration due to mold formation in storage, which comprises treating said shelled corn in a substantially closed system with an amount of ammonia gas and ethylene oxide in the gaseous state sufficient substantially to protect said corn from mold formation in storage, the ammonia and ethylene oxide being employed in stoichiometrical amounts.

3. A method for preserving corn which is normally subject to deterioration due to mold formation in storage, which comprises treating said corn in a substantially closed system with ammonia gas and then with ethylene oxide in the gaseous state, whereby an ethanolamine is formed in situ.

4. A method for preserving shelled corn which is normally subject to deterioration due to mold formation in storage, which comprises introducing ammonia gas from the bottom of a quantity of said shelled corn in a substantially closed system and after the ammonia has penetrated to the top of said closed system, introducing ethylene oxide in the gaseous state from the top of said closed system, whereby an ethanolamine is formed in situ.

5. A method for preserving shelled corn which is normally subject to deterioration due to mold formation in storage, which comprises introducing ammonia gas and ethylene oxide in the gaseous state substantially simultaneously to said shelled corn while the latter is being led to a storage container, whereby an ethanolamine is formed in situ.

6. Corn stabilized against mold formation in storage, which comprises corn which is normally subject to deterioration due to mold formation in storage and an ethanolamine near and on the surface of said shelled corn.

PHILIP CARLTON ANDERSON.
JANET LORRAINE COOPER RAPP.

REFERENCES CITED

The following references are of record in the file of this patent:

UNITED STATES PATENTS

| Number | Name | Date |
|---|---|---|
| 169,591 | Sacco | Nov. 2, 1875 |
| 223,602 | Naumann | Jan. 13, 1880 |
| 1,000,041 | Schneider | Aug. 8, 1911 |